US012559089B2

(12) United States Patent
    Dallas et al.

(10) Patent No.: US 12,559,089 B2
(45) Date of Patent: Feb. 24, 2026

(54) SYSTEM AND METHOD FOR DETERMINING A MAXIMUM PHASE RECOVERY ENVELOPE

(71) Applicant: Toyota Research Institute, Inc., Los Altos, CA (US)

(72) Inventors: James Andrew Dallas, San Jose, CA (US); Izumi Karino, Shizuoka (JP); Michael Thompson, San Juan Capistrano, CA (US); Minoru Brandon Araki, Cambridge, MA (US); Steven M Goldine, Sunnyvale, CA (US); Yan Ming Jonathan Goh, Palo Alto, CA (US); John Karl Subosits, Menlo Park, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 170 days.

(21) Appl. No.: 18/497,303

(22) Filed: Oct. 30, 2023

(65) Prior Publication Data

US 2025/0136089 A1     May 1, 2025

(51) Int. Cl.
    B60W 30/045      (2012.01)
    B60W 40/103      (2012.01)
    (Continued)

(52) U.S. Cl.
    CPC ........ B60W 30/045 (2013.01); B60W 40/103 (2013.01); B60W 40/114 (2013.01);
    (Continued)

(58) Field of Classification Search
    CPC ............. B60W 30/045; B60W 40/103; B60W 40/114; B60W 40/13; B60W 50/0097;
    (Continued)

(56) References Cited

U.S. PATENT DOCUMENTS

| | | | |
|---|---|---|---|
| 11,760,381 B1 * | 9/2023 | Gray | ..................... B60W 50/00 701/23 |
| 11,801,844 B2 * | 10/2023 | Bobier-Tiu | ............. B60T 8/172 |

(Continued)

OTHER PUBLICATIONS

Bobier-Tiu et al., A Unified MPC Envelope Control Formulation for Toyota Guardian and Chauffeur, 2022 Science Direct, IFAC PapersOnLine, pp. 19-24 (Year: 2022).*

(Continued)

*Primary Examiner* — Sze-Hon Kong
(74) *Attorney, Agent, or Firm* — Christopher G. Darrow; Darrow Mustafa PC

(57) ABSTRACT

Systems and methods for determining a maximum phase recovery envelope are disclosed herein. In one example, a system includes a processor and a memory having a vehicle control module. The vehicle control module includes instructions that, when executed by the processor, cause the processor to determine a critical point on a phase plane indicating a maximum defined recovery point a vehicle can recover from, perform forward and reverse simulations from the critical point to define outermost contours of a maximum phase recovery envelope using parameters and state of the vehicle, and cause the vehicle to operate within the maximum phase recovery envelope.

20 Claims, 9 Drawing Sheets

(51) Int. Cl.

| | |
|---|---|
| *B60W 40/114* | (2012.01) |
| *B60W 40/13* | (2012.01) |
| *B60W 50/00* | (2006.01) |
| *B60W 50/10* | (2012.01) |

(52) U.S. Cl.
CPC ........ *B60W 40/13* (2013.01); *B60W 50/0097* (2013.01); *B60W 50/10* (2013.01); *B60W 2040/1315* (2013.01); *B60W 2040/1323* (2013.01); *B60W 2300/28* (2013.01); *B60W 2510/0657* (2013.01); *B60W 2520/14* (2013.01); *B60W 2520/20* (2013.01); *B60W 2520/30* (2013.01); *B60W 2530/10* (2013.01); *B60W 2530/20* (2013.01)

(58) Field of Classification Search
CPC ......... B60W 50/10; B60W 2040/1315; B60W 2040/1323; B60W 2300/28; B60W 2510/0657; B60W 2520/14; B60W 2520/20; B60W 2520/30; B60W 2530/10; B60W 2530/20; B60W 30/02; B60W 2050/0031; B60W 2720/14; B60W 2720/20

See application file for complete search history.

(56) References Cited

U.S. PATENT DOCUMENTS

| | | | | |
|---|---|---|---|---|
| 2019/0263399 | A1* | 8/2019 | He | B60W 60/0015 |
| 2020/0216085 | A1 | 7/2020 | Bobier-Tu et al. | |
| 2023/0063613 | A1* | 3/2023 | Gao | B60W 30/18172 |
| 2023/0365149 | A1* | 11/2023 | Bobier-Tiu | B60W 60/001 |
| 2024/0067209 | A1* | 2/2024 | Bárdos | B60W 60/0011 |
| 2024/0400101 | A1* | 12/2024 | Topan | B60W 60/0015 |
| 2025/0115263 | A1* | 4/2025 | Dallas | B60W 10/20 |

OTHER PUBLICATIONS

Song et al., Vehicle steady drifting control with safety boundary constraints, 2024, Springer, pp. 18235-18254 (Year: 2024).*

Arab et al., Safety-Guaranteed Learning-Predictive Control for Aggressive Autonomous Vehicle Maneuvers, Jul. 6-9, 2020, IEEE/Asme International Conference on Advanced Intelligent Mechatronics, pp. 1036-1041 (Year: 2020).*

Beal et al., Controlling Vehicle Instability Through Stable Handling Envelopes, Oct. 31-Nov. 2, 2011, Proceedings of the ASME 2011 Dynamic Systems and Control Conference, pp. 1-8 (Year: 2011).*

Beal et al., Model Predictive Control for Vehicle Stabilization at the Limits of Handling, Jul. 2013, IEEE Transactions on Control Systems Technology, vol. 21, No. 4, pp. 1258-1269 (Year: 2013).*

Jalaliyazdi, Integrated Vehicle Stability Control and Power Distribution Using Model Predictive Control, 2016, Core.ac.uk, pp. 1-147 (Year: 2016).*

Goh et al., "Toward Automated Vehicle Control Beyond the Stability Limits: Drifting Along a General Path", Journal of Dynamic Systems, Measurement, and Control, 142(2), 2020, p. 021004.

Beal et al., "Controlling Vehicle Instability Through Stable Handling Envelopes", Dynamic Systems and Control Conference, vol. 54761, 2011, pp. 861-868.

Erlien et al., "Shared Steering Control Using Safe Envelopes for Obstacle Avoidance and Vehicle Stability", IEEE Transactions on Intelligent Transportation Systems 17.2, 2015, pp. 441-451.

Dallas et al., "Contingent Nonlinear Model Predictive Control for Collision Imminent Steering in Uncertain Environments", IFAC-PapersOnLine 53.2, 2020, pp. 14330-14335.

Byeon et al., "Skill-level-based Hybrid Shared Control for Human-Automation Systems", 2021 IEEE International Conference on Systems, Man, and Cybernetics (SMC), 2021.

Dallas et al., "A hierarchical adaptive nonlinear model predictive control approach for maximizing tire force usage in autonomous vehicles", Field Robotics, vol. 3, 2023, pp. 222-242.

Goh, Jonathan Yan Ming. "Automated Vehicle Control Beyond the Stability Limits", Stanford University, 2019.

Wurts et al., "Adaptive Nonlinear Model Predictive Control for Collision Imminent Steering with Uncertain Coefficient of Friction", 2020 American Control Conference (ACC), 2020, pp. 4856-4861.

Dallas et al., "Terrain Adaptive Trajectory Planning and Tracking on Deformable Terrains", IEEE Transactions on Vehicular Technology, vol. 70, No. 11, 2021, pp. 11255-11268.

Yi et al., "An investigation into differential braking strategies for vehicle stability control", Proceedings of the Institution of Mechanical Engineers, Part D: Journal of Automobile Engineering, vol. 217, No. 12, 2003, pp. 1081-1093.

Brown et al., "Coordinating Tire Forces to Avoid Obstacles Using Nonlinear Model Predictive Control", IEEE Transactions on Intelligent Vehicles, vol. PP, 2019, pp. 1-11.

Bobier, C.G., "A Phase Portrait Approach to Vehicle Stabilization and Envelope Control", Stanford University, 2012.

Erlien et al., "Safe driving envelopes for shared control of ground vehicles", IFAC Proceedings vols. vol. 46, No. 21, 2013, pp. 831-836.

Schwarting et al., "Parallel Autonomy in Automated Vehicles: Safe Motion Generation with Minimal Intervention", 2017 IEEE International Conference on Robotics and Automation (ICRA), 2017, pp. 1928-1935.

Svendenius, Jacob, "Tire Modeling and Friction Estimation", Lund University, 2007, 98 pages.

Erlien et al., "Incorporating Non-Linear Tire Dynamics into a Convex Approach to Shared Steering Control", 2014 American Control Conference, 2014, pp. 3468-3473.

Luo et al., "A Workload Adaptive Haptic Shared Control Scheme for Semi-Autonomous Driving", Accident Analysis & Prevention, vol. 152, 2021, 10 pages.

Bhardwaj et al., "Who's the Boss? Arbitrating Control Authority between a Human Driver and Automation System", Transportation Research Part F: Traffic Psychology and Behaviour, vol. 68, 2020, pp. 144-160.

Anderson et al., "An optimal-control-based framework for trajectory planning, threat assessment, and semi-autonomous control of passenger vehicles in hazard avoidance scenarios", Robotics Research, C. Pradalier, R. Siegwart, and G. Hirzinger, Eds. Berlin, Heidelberg: Springer Berlin Heidelberg, 2011, pp. 39-54.

Petermeijer et al., "Should Drivers Be Operating Within an AutomationFree Bandwidth? Evaluating Haptic Steering Support Systems With Different Levels of Authority", Human Factors, vol. 57, No. 1, 2015, pp. 5-20.

Karino et al. "Shared control for giving ordinary driver's expert level drifting skills", 2023 IEEE Conference on Systems, Man, and Cybernetics, 2023.

* cited by examiner

SYSTEM AND METHOD FOR DETERMINING A MAXIMUM PHASE RECOVERY ENVELOPE

TECHNICAL FIELD

The subject matter described herein relates, in general, to systems and methods for determining a maximum phase recovery envelope (MPRE) and causing a vehicle to operate within the MPRE.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles can intervene and control one or more vehicle systems when it is determined that the vehicle's driver may be operating their vehicle unsafely. For example, electronic stability control (ESC), also referred to as electronic stability program (ESP) or dynamic stability control (DSC), improves a vehicle's stability by detecting and reducing loss of traction and automatically applying the brakes to help steer the vehicle where the driver intends to go.

SUMMARY

This section generally summarizes the disclosure and is not a comprehensive explanation of its full scope or all its features.

In one embodiment, a system includes a processor and a memory having a vehicle control module. The vehicle control module includes instructions that, when executed by the processor, cause the processor to determine a critical point on a phase plane indicating a maximum allowed recovery point a vehicle can recover from, perform forward and reverse simulations from the critical point to define outermost contours of an MPRE using parameters and state of the vehicle, and cause the vehicle to operate within the MPRE.

In another embodiment, a method includes the steps of determining a critical point on a phase plane indicating a maximum allowed recovery point a vehicle can recover from, performing forward and reverse simulations from the critical point to define the outermost contours of an MPRE using parameters and state of the vehicle, and causing the vehicle to operate within the MPRE.

In yet another embodiment, a non-transitory computer-readable medium has instructions that, when executed by a processor, cause the processor to determine a critical point on a phase plane indicating a maximum allowed recovery point a vehicle can recover from, perform forward and reverse simulations from the critical point to define outermost contours of an MPRE using parameters and state of the vehicle, and cause the vehicle to operate within the MPRE.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for determining an MPRE. Moreover, the MPRE allows for greater driver control before one or more electronic systems intervene to prevent the vehicle from operating unsafely, such as spinning out. The systems and methods described herein may be an online approach to determine the MPRE, allowing for online adaptation to vehicle conditions such as changing friction and velocity. Given the vehicle's current state from measurements, this approach defines the state space where a feasible action can prevent the vehicle from spinning out.

In one example, the MPRE is calculated by first deriving the conditions that define the maximum allowed sideslip and yaw rate the vehicle can reach and still recover from. Then, given measurements and vehicle parameters, the system and method forward and reverse simulate the yaw rate-sideslip contour corresponding to this point. This simulation is done online and defines the MPRE bounding contour. Once the MPRE is determined, the systems and methods can cause the vehicle to operate within the MPRE.

Figure 1:
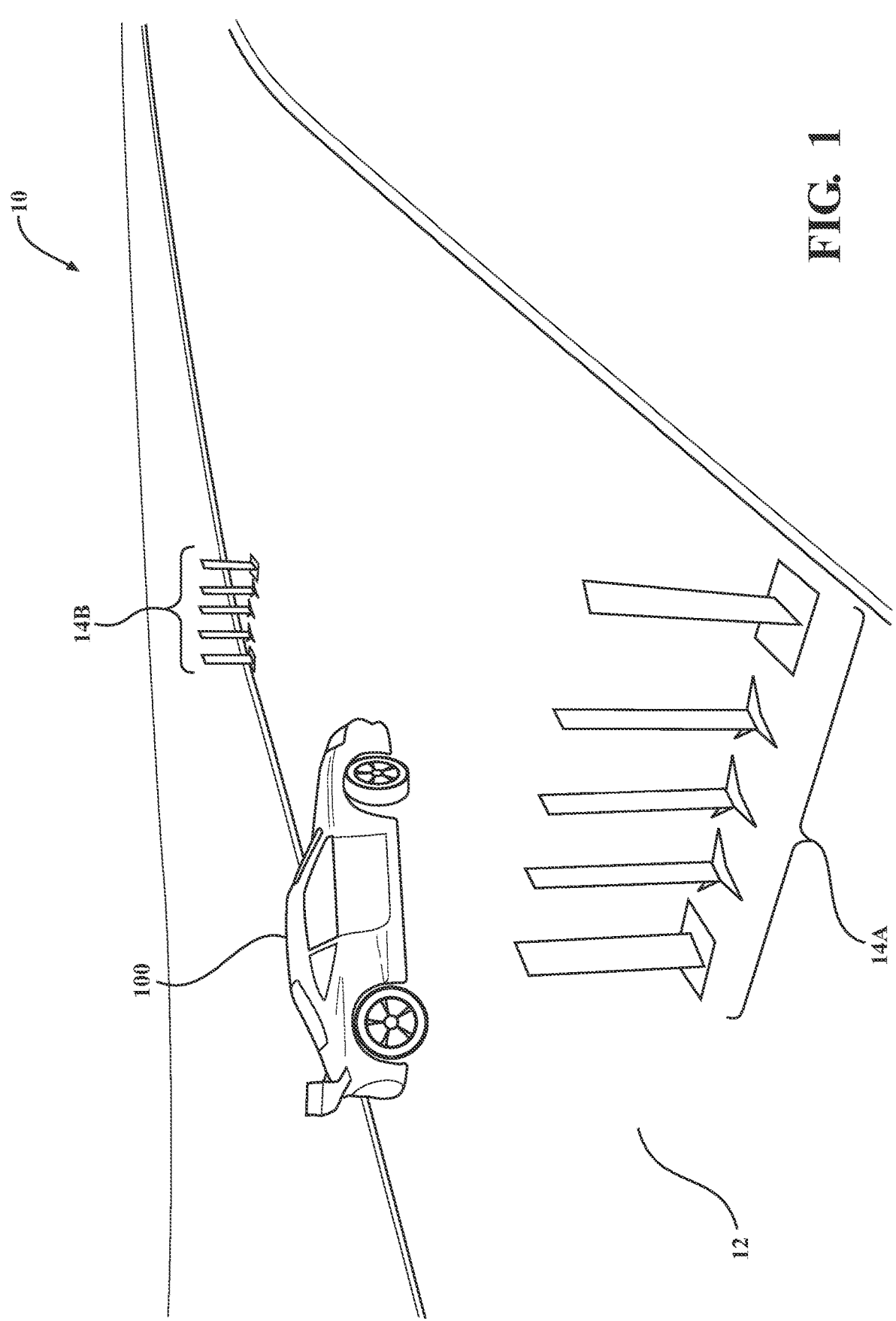
FIG. 1 illustrates one example of a vehicle operating within an MPRE.

FIG. 1 illustrates an example of an environment 10 that includes a roadway in the form of a track 12. Here, the track 12 includes obstacles 14A and 14B that require the driver of a vehicle, such as the vehicle 100 to maneuver through. Prior art systems normally create a safe handling envelope that defines when one or more electronic safety systems intervene to slow the vehicle 100 or override one or more driver commands. For example, if the driver of the vehicle intentionally oversteers and creates a loss of traction, sometimes referred to as drifting, one or more electronic safety systems usually intervene and apply the brakes to one or more vehicles to prevent this loss of traction from occurring.

However, the systems and methods described herein can create an MPRE in an online fashion that allows the vehicle 100 to operate much more aggressively, including allowing the driver to utilize drifting techniques to allow them to maneuver through the obstacles 14A and 14B at greater velocities. In this example, the vehicle 100 is essentially drifting through the obstacles 14A and 14B, allowing the vehicle 100 to maneuver with higher agility than what would normally be possible utilizing traditional safety systems.

Figure 2:
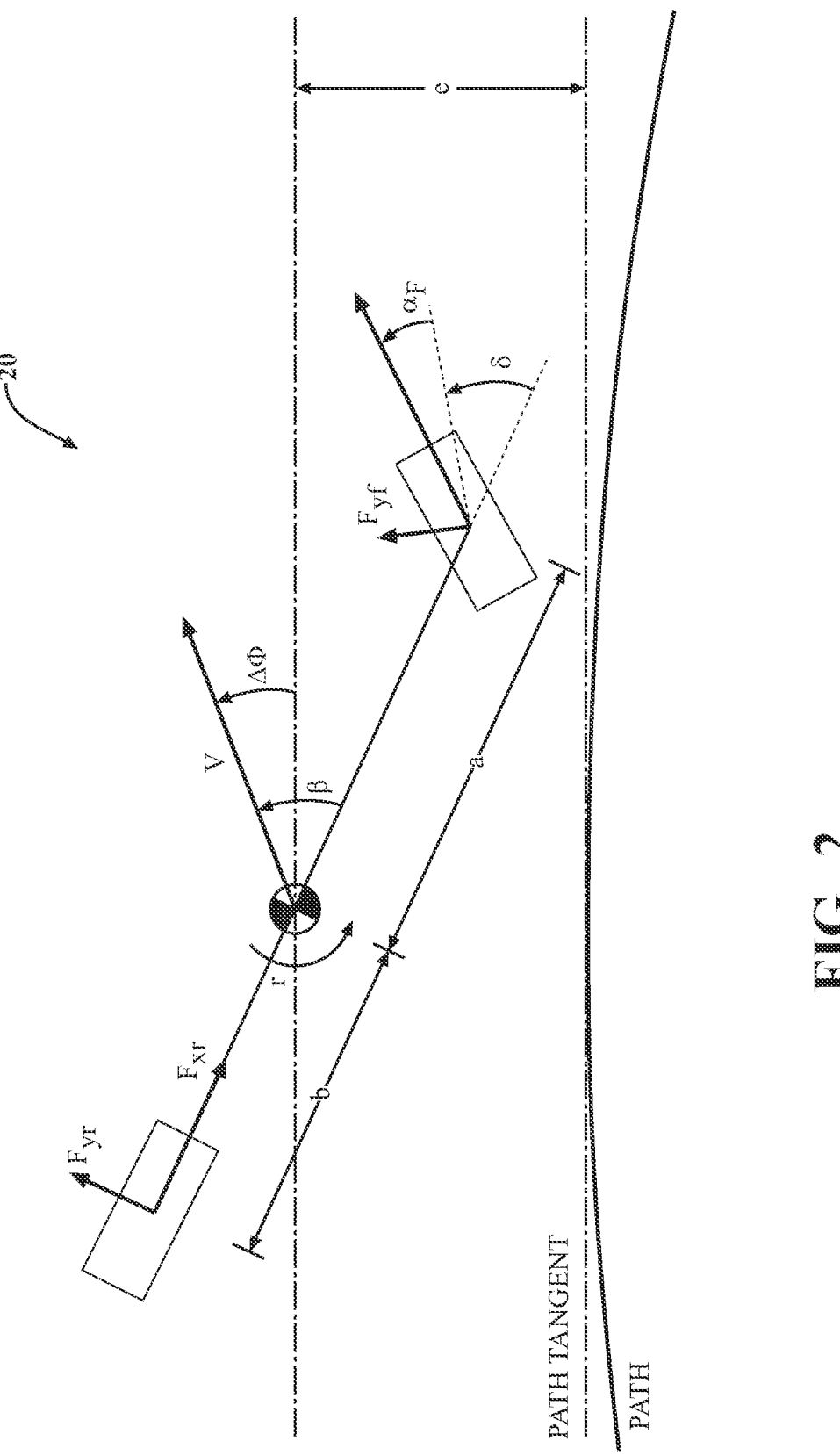
FIG. 2 illustrates an example of a bicycle model that may be utilized to determine the MPRE.

To better understand how the MPRE is derived, reference is first made to FIG. 2, which illustrates a vehicle model 20 that describes vehicle dynamics, such as the vehicle dynamics of the vehicle 100. The vehicle model 20 is sometimes referred to as a bicycle model. However, it should be understood that other types of models may also be utilized to describe vehicle dynamics.

The vehicle state using the vehicle model 20 is given as:

$$x = \begin{bmatrix} r \\ V \\ \beta \\ \omega_r \\ e \\ \Delta\phi \\ \delta \\ \tau \end{bmatrix} = \begin{bmatrix} \text{Yaw rate} \\ \text{Velocity} \\ \text{Sideslip} \\ \text{Rear wheelspeed} \\ \text{Lateral error} \\ \text{Course error} \\ \text{Roadwheel angle} \\ \text{Engine torque} \end{bmatrix}. \tag{1}$$

The systems and methods described herein focus on drifting; therefore, brakes are not included in the inputs. As such, the control inputs are defined as:

$$u = \begin{bmatrix} \dot{\delta} \\ \dot{\tau} \end{bmatrix} = \begin{bmatrix} \text{Roadwheel angle rate} \\ \text{Engine torque rate} \end{bmatrix}. \tag{2}$$

The state derivatives are defined as:

$$\dot{x} = \begin{bmatrix} \dfrac{aF_{yf}\cos\delta + aF_{xf}\sin\delta - bF_{yr}}{I_z} \\[6pt] \dfrac{-F_{yf}\sin(\delta - \beta) + F_{xf}\cos(\delta - \beta) + F_{yr}\sin\beta + F_{xr}\cos\beta}{m} \\[6pt] \dfrac{F_{yf}\cos(\delta - \beta) + F_{xf}\sin(\delta - \beta) + F_{yr}\cos\beta - F_{xr}\sin\beta}{mV} - r \\[6pt] \dfrac{r_w(G\tau - F_{xr}r_w)}{I_w} \\[6pt] V\sin(\Delta\phi) \\[6pt] \dot{\phi} - \kappa_{ref}\dfrac{V\cos(\Delta\phi)}{1 - \kappa_{ref}e} \\[6pt] \dot{\delta} \\[6pt] \dot{\tau} \end{bmatrix} \tag{3}$$

and $$\dot{\phi} = \dot{\beta} + r. \tag{4}$$

Here, $\tau_w$ is the wheel torque, and $\kappa_{ref}$ is the reference curvature. Relevant vehicle parameters are given in the table below:

TABLE

| Vehicle Parameters | |
| --- | --- |
| Symbol | Parameter |
| a | Front axle center of mass distance |
| b | Rear axle center of mass distance |
| $h_{cg}$ | Center of gravity height |
| $r_w$ | Tire radius |
| G | Engine to wheel torque ratio |
| M | Vehicle mass |
| $I_z$ | Vehicle yaw moment of inertia |
| $I_w$ | Lumped rear axle yaw moment of inertia |
| $\mu_f$ | Front coefficient of friction |

TABLE-continued

| Vehicle Parameters | |
| --- | --- |
| Symbol | Parameter |
| $\mu_r$ | Rear coefficient of friction |
| $C_f$ | Tire cornering stiffness |

The tire forces are given by a coupled slip Fiala tire model for the front and rear longitudinal and lateral forces $F_{xf,r}$ and $F_{yf,r}$, respectively. As such, tire forces are represented as:

$$\begin{bmatrix} F_y \\ F_x \end{bmatrix} = F_{total} \begin{bmatrix} -\tan(\alpha) \\ \dfrac{\sigma}{\kappa} \\ \dfrac{\kappa}{\sigma} \end{bmatrix} \tag{5}$$

where $\alpha$ is the tire slip angle, $\sigma$ is the combined slip, $\kappa$ is the longitudinal slip, and $F_{total}$ is:

$$F_{total} = \begin{cases} C_f\sigma - \dfrac{C_f^2\sigma^2}{3\mu F_z} + \dfrac{C_f^3\sigma^3}{27(\mu F_z)^2} & \land \lor \sigma \lor \sigma_{sl} \\[8pt] \mu F_z & \land \lor \sigma \lor \sigma_{sl} \end{cases}. \tag{6}$$

$F_z$ is the normal load, and the total slip at which the tire begins fully sliding, $\sigma_{sl}$, is represented by:

$$\sigma_{sl} = \arctan(3\mu F_z/C_f). \tag{7}$$

As mentioned, the MPRE captures the unstable yet still recoverable states where the vehicle 100 can be stabilized. Before going into further details regarding how the MPRE is determined, a brief description of the vehicle 100 will be given. Moreover, referring to FIG. 3, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

The automated/autonomous systems or combination of systems may vary in various embodiments. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 160.

The vehicle 100 also includes various elements. It will be understood that in various embodiments it may not be necessary for the vehicle 100 to have all of the elements shown in FIG. 3. The vehicle 100 can have any combination of the various elements shown in FIG. 3. Further, the vehicle 100 can have additional elements to those shown in FIG. 3. In some arrangements, the vehicle 100 may be implemented without one or more of the elements shown in FIG. 3. While the various elements are shown as being located within the vehicle 100 in FIG. 3, it will be understood that one or more of these elements can be located external to the vehicle 100. Further, the elements shown may be physically separated by large distances and provided as remote services (e.g., cloud-computing services).

Figure 3:
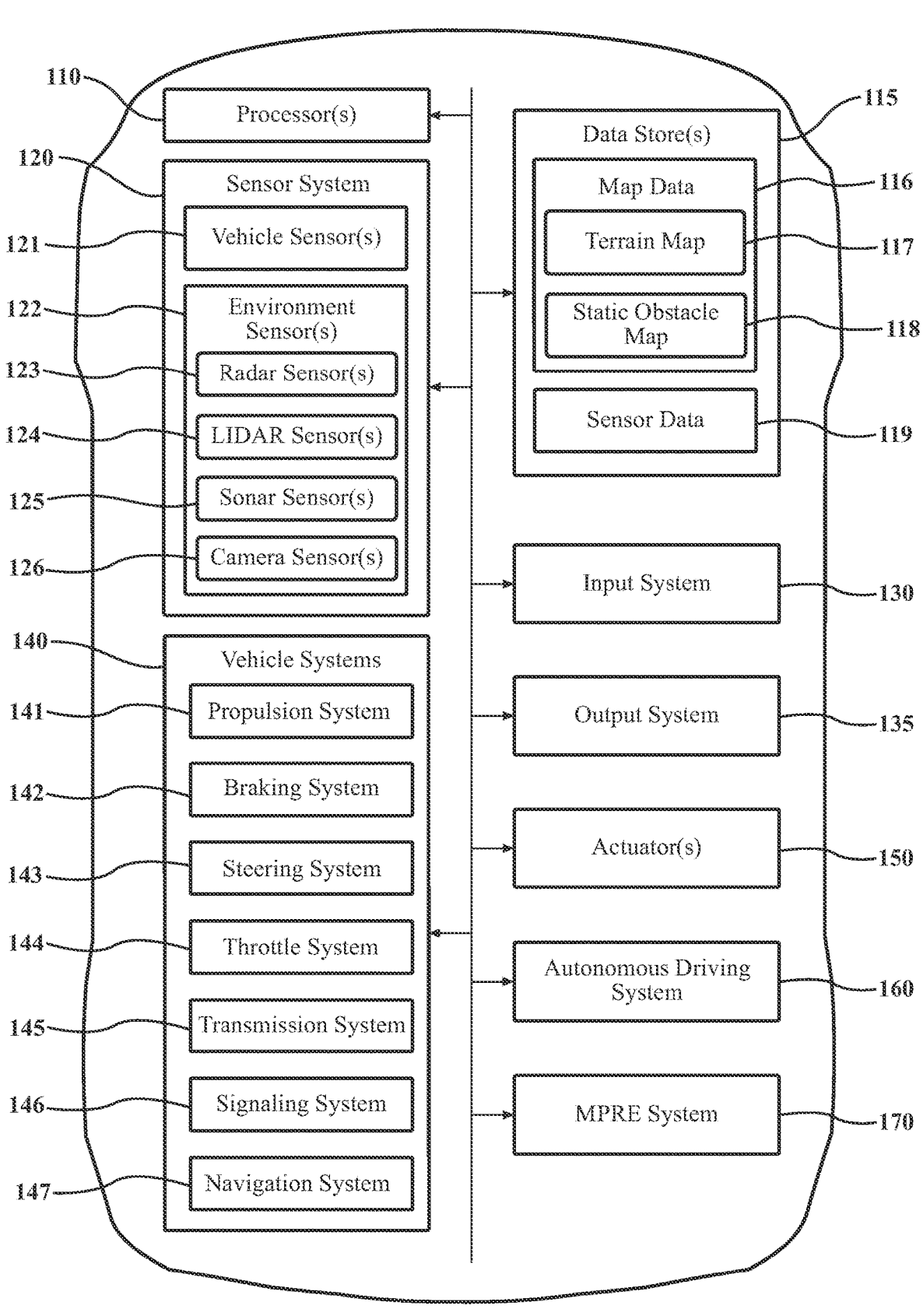
FIG. 3 illustrates one example of a vehicle incorporating a system for determining an MPRE.

Some of the possible elements of the vehicle 100 are shown in FIG. 3 and will be described along with subsequent figures. However, a description of many of the elements in FIG. 3 will be provided after the discussion of the figures for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

Figure 4:
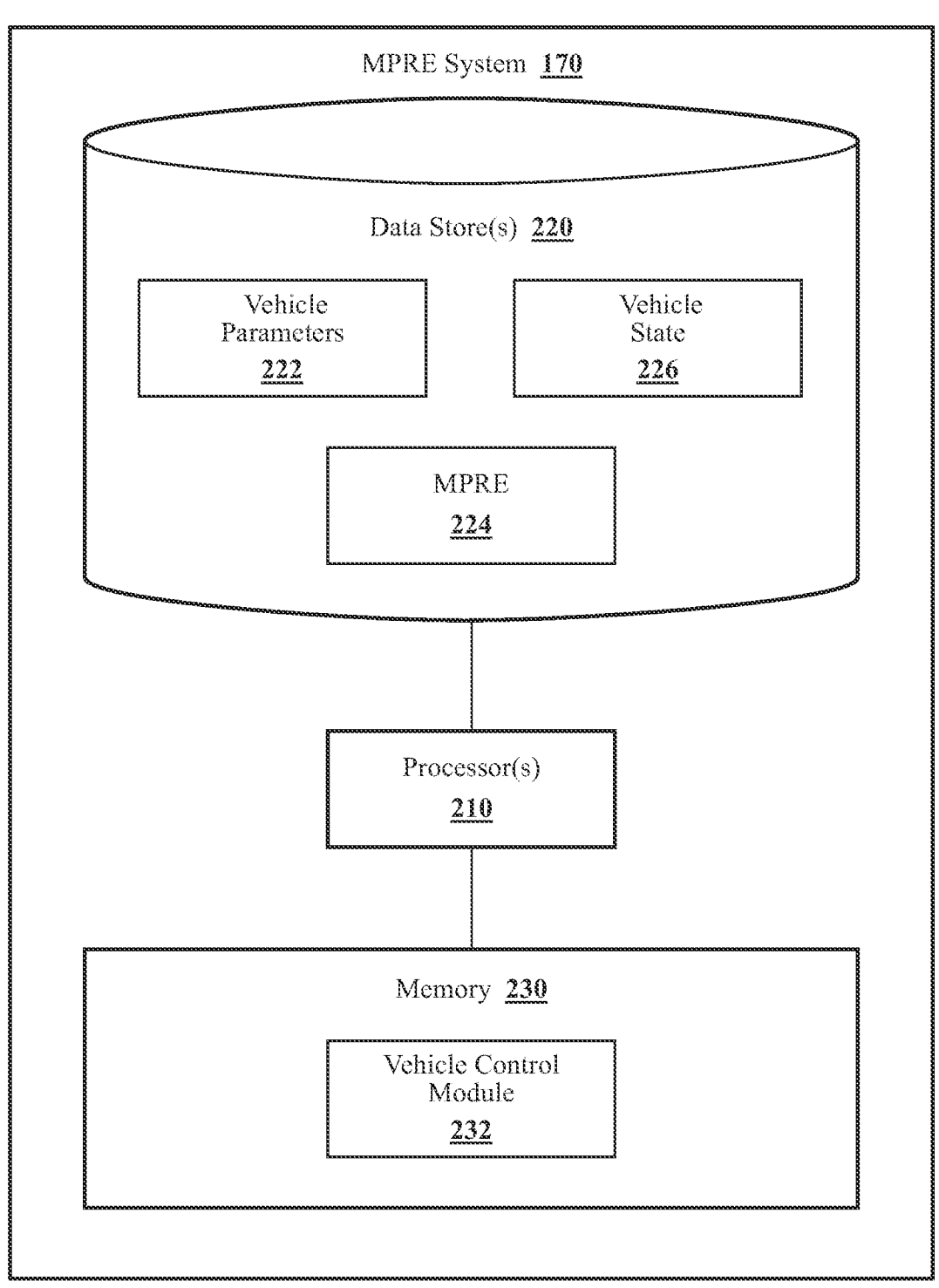
FIG. 4 illustrates a more detailed view of a system for determining an MPRE.

In either case, the vehicle 100 includes an MPRE system 170. The MPRE system 170 may be incorporated within an autonomous driving system 160 or may be separate, as shown. The MPRE system 170 determines the MPRE that generally captures the unstable but still recoverable states where the vehicle 100 can be stabilized. With reference to FIG. 4, one embodiment of the MPRE system 170 is further illustrated. As shown, the MPRE system 170 includes a processor(s) 210. Accordingly, the processor(s) 210 may be a part of the MPRE system 170, or the MPRE system 170 may access the processor(s) 210 through a data bus or another communication path. For example, the processor(s) 210 may be one or more processor(s) 110 found within the vehicle 100.

In one or more embodiments, the processor(s) 210 is an application-specific integrated circuit that is configured to implement functions associated with a vehicle control module 232. In general, the processor(s) 210 is an electronic processor, such as a microprocessor, capable of performing various functions described herein. In one embodiment, the MPRE system 170 includes a memory 230 that stores the vehicle control module 232. The memory 230 is a random-access memory (RAM), read-only memory (ROM), a hard disk drive, a flash memory, or other suitable memory for storing the vehicle control module 232. The vehicle control module 232 is, for example, computer-readable instructions that, when executed by the processor(s) 210, cause the processor(s) 210 to perform the various functions disclosed herein.

Furthermore, in one embodiment, the MPRE system 170 includes data store(s) 220. The data store(s) 220 is, in one embodiment, an electronic data structure such as a database that is stored in the memory 230 or another memory and that is configured with routines that can be executed by the processor(s) 210 for analyzing stored data, providing stored data, organizing stored data, and so on. Thus, in one embodiment, the data store(s) 220 stores data used by the vehicle control module 232 in executing various functions. In one embodiment, the data store(s) 220 includes vehicle parameters 222 and vehicle state 226, previously described when describing the vehicle model 20. The MPRE 224 calculated by the MPRE system 170 may also be stored within the data store(s) 220 and can be used by the various vehicle control systems to cause the vehicle 100 to operate within the MPRE 224.

Accordingly, the vehicle control module 232 generally includes instructions that control the processor(s) 210 to determine the MPRE 224 and cause the vehicle 100 to operate within the confines of the MPRE 224. Moreover, the MPRE allows the vehicle to operate such that the front and rear tires of the vehicle 100 have the potential to be saturated within a safe region defined by the MPRE 224. In the case where all tires are saturated, and the steering actuation limit is reached, the vehicle 100 may still be in a recoverable state given an appropriate input. In some cases, the vehicle 100, as explained before, may be a fully autonomous vehicle, may share control with the driver, or act as a safety feature that activates if it is deemed necessary to keep the driver safe.

The vehicle control module 232 includes instructions that, when executed by the processor(s) 210, cause the processor(s) 210 to first determine a critical point on a phase plane, indicating a maximum allowed recovery point the vehicle 100 can recover from. As such, the critical point may be defined as the maximum allowed sideslip and the maximum yaw rate the vehicle 100 can recover from. In other words, the critical point may be at an outermost nullcline of a positive maximum counter steer and a negative maximum counter steer that prevents the vehicle 100 from spinning out. Spinning out generally occurs when the front tires of the vehicle 100 are saturated and/or when the steering actuation limits of the vehicle are reached. These two conditions result in losing steering authority, wherein additional forces cannot be generated because the tires are saturated, or no additional steering angle can be generated. The MPRE 224 is defined as the outermost allowed contour such that the vehicle can recover without spinning out.

To better understand, reference is made to FIGS. 5A-5D, which illustrate different examples of phase portraits 300A-300D that illustrate how the MPRE 224 is determined. The critical points 302A-302D lie at the edges of the boundaries that define the MPRE 224. The MPRE 224 may be constructed based on the following conditions: (1) feasible spin recovery action is applied; no throttle, no brakes, and maximum counter steer, (2) tires and steering actuation are saturated, (3) finding the point on the phase plane where $d\beta/dt=0$ and $\beta=\pm\pi/2$. Note $\beta=\pm\pi/2$ is one example of allowable sideslip, and a vehicle may still be recoverable beyond $\beta=\pm\pi/2$. However, autonomy features have not yet been demonstrated past this region.

The critical points 302A-302D can be a specified sideslip that one does not want to exceed. Moreover, one could use the maximum sideslip the vehicle 100 can recover from or a restricted version selected by the designer that the driver should not exceed (e.g., $\beta=\pm\pi/4$ instead of $\beta=\pm\pi/2$). However, in some cases, some vehicles may be able to exceed $\beta=\pm\pi/2$. As such, the critical point can vary accordingly.

For the negative steering case, conditions (1) and (2) yield $$\delta = -\delta_{max} \tag{8}$$

$$\alpha = -\sigma_{sl} \tag{9}$$

$$F_{xf} = F_{xr} = 0 \tag{10}$$

$$F_{yf} = \mu_f F_{zf}, F_{yr} = \mu_r F_{zr} \tag{11}$$

these conditions, combined with $d\beta/dt=0$ from Equation 3 yields:

$$r = \frac{\mu_f F_{zf} \cos(-\delta_{max} - \beta) + \mu_r F_{zr} \cos(\beta)}{mV} \tag{12}$$

where $F_{zf}$ and $F_{zr}$ are the normal loads on the front and rear axle, respectively.

In the case of positive steering:

$$\delta = \delta_{max} \tag{13}$$

$$\alpha = \sigma_{sl} \tag{14}$$

This yields:

$$r = \frac{-\mu_f F_{zf} \cos(\delta_{max} - \beta) - \mu_r F_{zr} \cos(\beta)}{mV} \tag{15}$$

As such, the critical points 302A-302D, can be mathematically defined as:

$$\begin{cases} \beta = \pm \pi/2 \wedge \\ r = \frac{\mu_f F_{zf} \cos(-\delta_{max} - \beta) + \mu_r F_{zr} \cos(\beta)}{mV} \wedge \text{ if } \delta \leq 0 \\ r = \frac{-\mu_f F_{zf} \cos(\delta_{max} - \beta) - \mu_r F_{zr} \cos(\beta)}{mV} \wedge \text{ if } \delta \geq 0 \end{cases} \tag{16}$$

Once the critical points 302A-302E have been defined, the instructions within the vehicle control module 232, when executed by the processor(s) 210, cause the processor(s) 210 perform forward and reverse simulations from the critical points 302A-302E to define the outermost contours of the MPRE using parameters and state of the vehicle 100.

Moreover, from the critical points 302A-302E, the processor(s) 210 simulates forward in time (lines 308A-308D) and backward in time (lines 306A-306D) to define the left outermost contour of the MPRE 224. The instructions within the vehicle control module 232 also cause the processor(s) 210 to repeat this for the right side of the MPRE both forward in time (lines 310A-310D) and backward in time (lines 312A-312D).

As such, the lines 306A-306D, 308A-308D, 310A-310D, 312A-312D define the contours of MPREs 330A-330D, respectively. The MPREs 330A-330D define a much larger space than traditional safety handling envelopes 340A-340D, which are generally much more aggressive with intervening to prevent any type of loss of traction (wheel saturation). As such, the vehicle 100 can be recovered by applying maximum negative countersteer in some states and maximum positive countersteer and others.

As mentioned before, MPREs 330A-330D are determined in an online fashion and can be adjusted in real-time. With attention to FIGS. 5A and 5B, the MPRE 330A was determined when the velocity of the vehicle 100 was at 10 m/s, and the coefficient of friction was 0.95. The MPRE 330B was determined when the velocity of the vehicle 100 was at 20 m/s, and the coefficient of friction was 0.5. Notably, the MPRE 330B is smaller than the MPRE 330A, restricting the number of allowable feasible states.

Figure 5A:
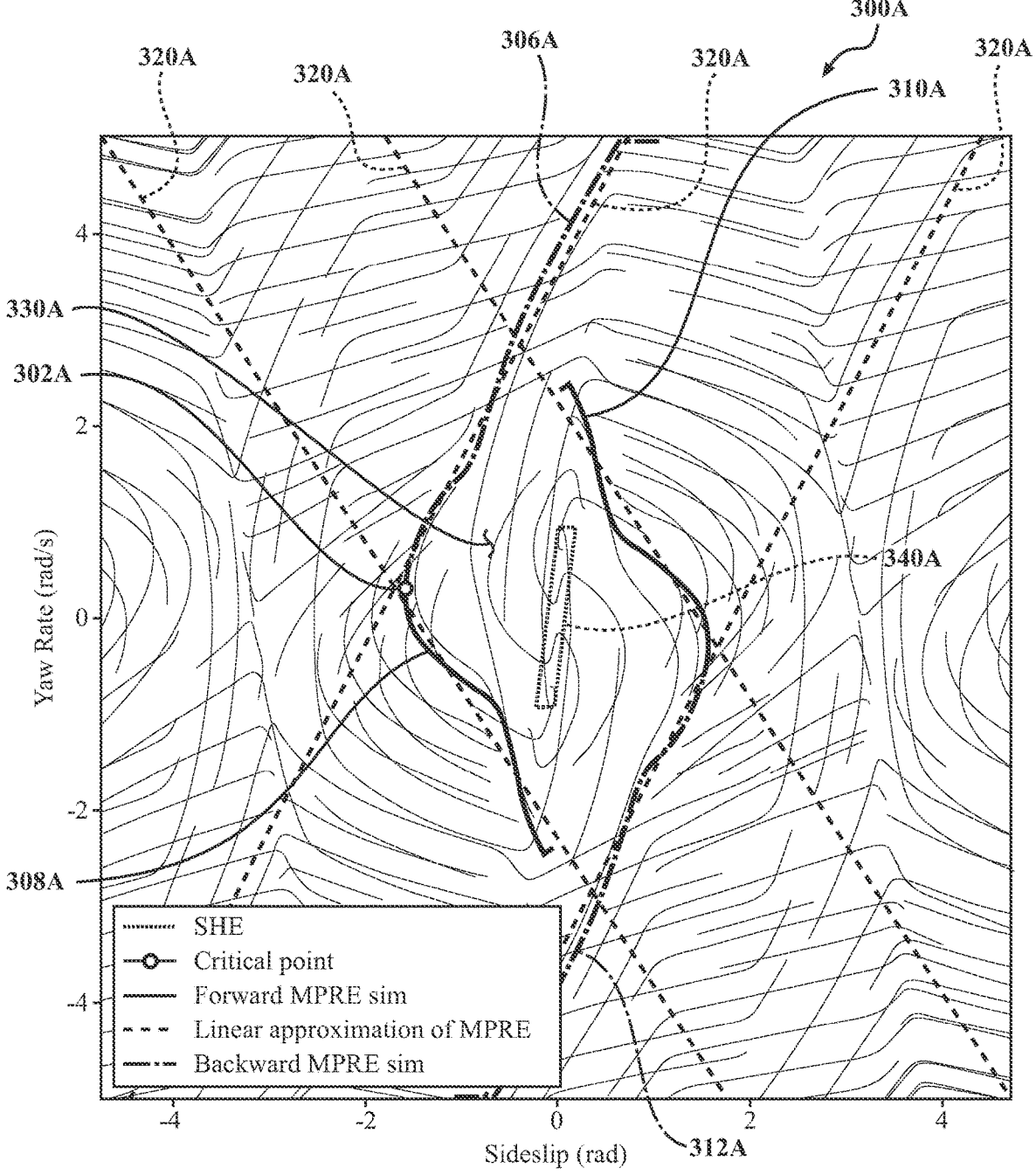
FIGS. 5A-5D illustrate different examples of phase portraits illustrating how an MPRE is determined.
Figure 5B:
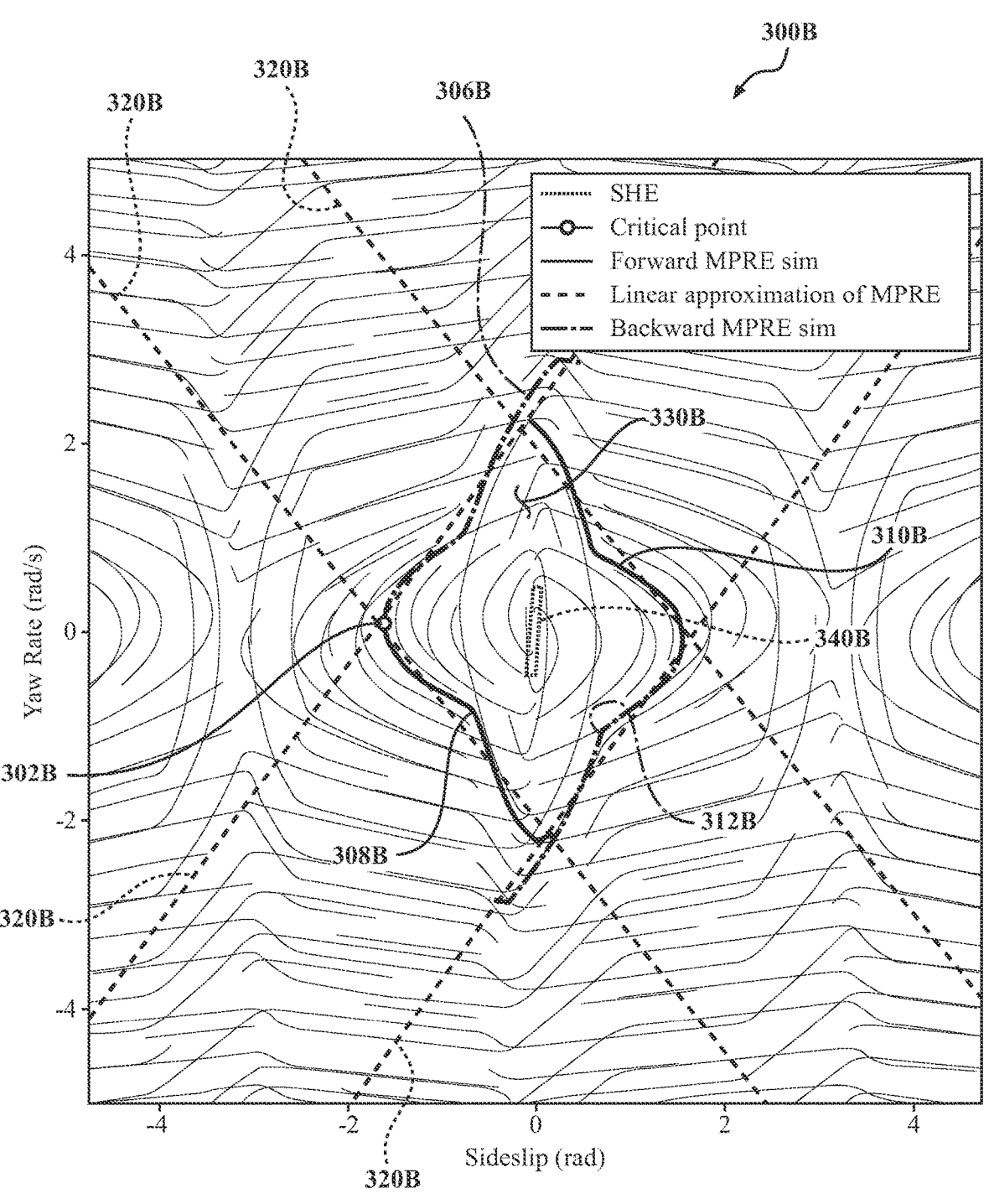
Figure 5C:
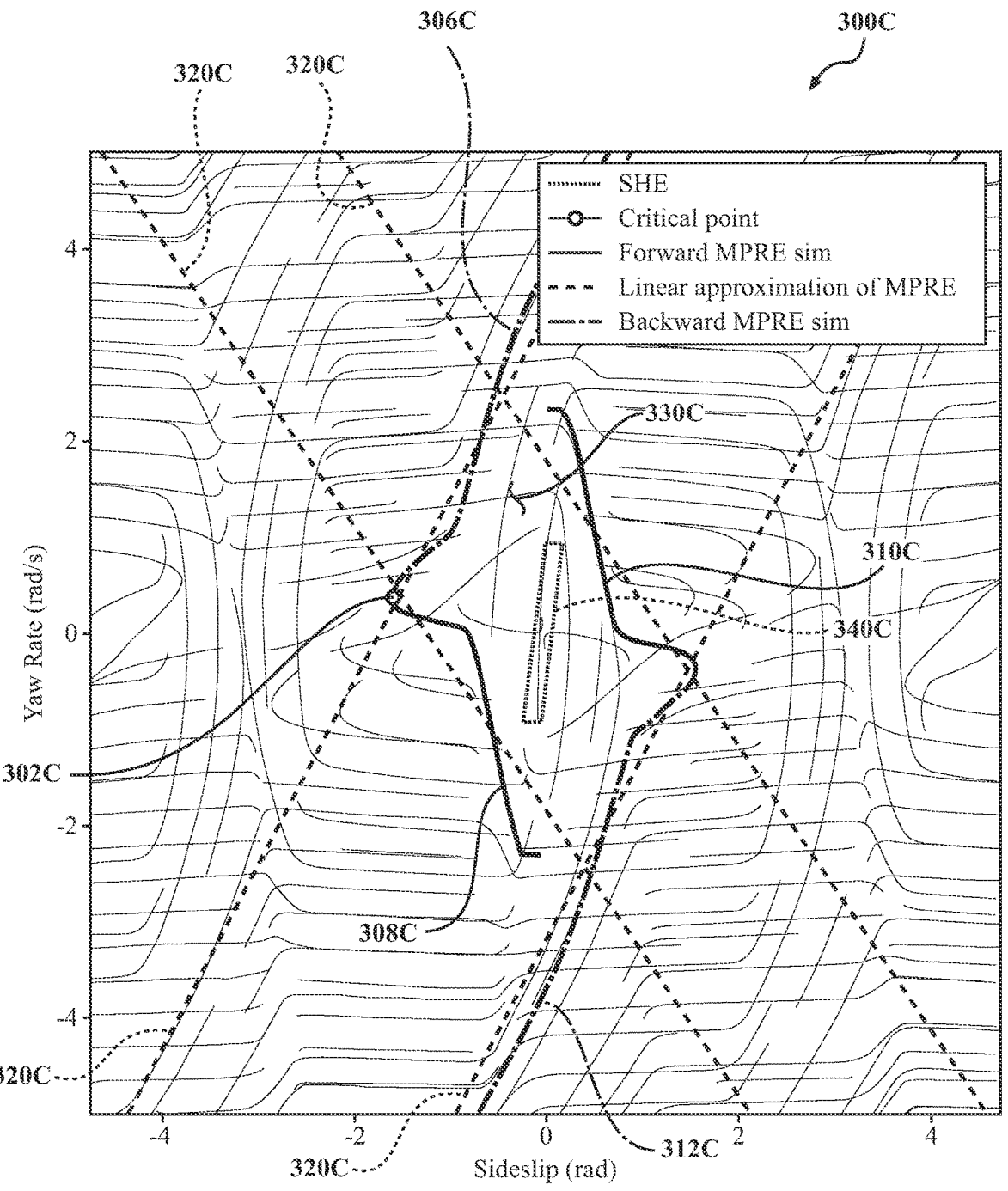
Figure 5D:
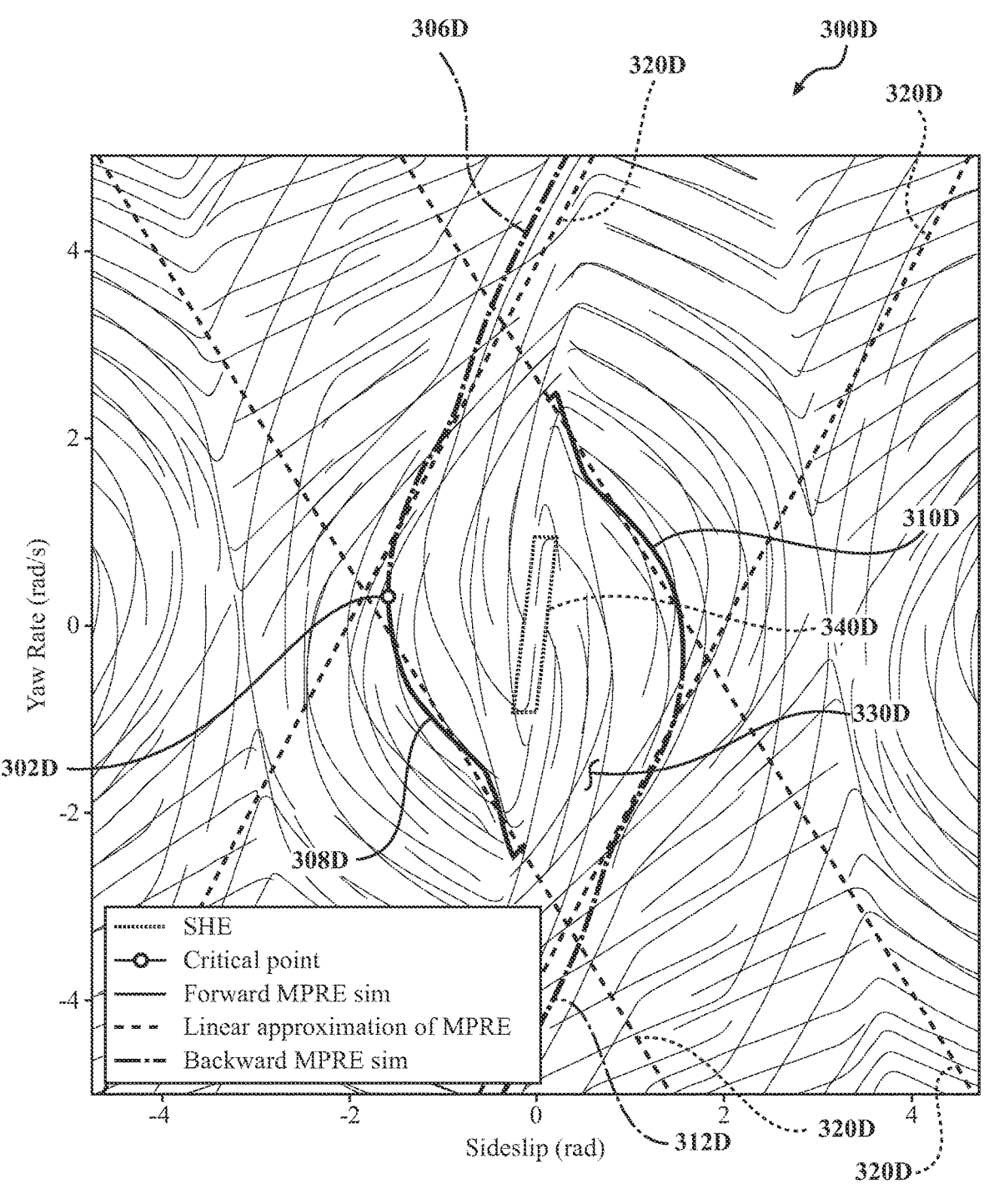

With attention to FIGS. 5C and 5D, MPRE 330C illustrate the case of varying vehicle characteristics to bias under/oversteer where the front coefficient of friction of 1.2 and the rear is 0.95, while MPRE 330D shows the case where the front coefficient of friction of 0.95 and the rear is 1.2.

Once the contours of MPREs 330A-330D are defined, instructions within the vehicle control module 232 cause the processor(s) 210 to approximate the MPREs 330A-330D utilizing linear approximation, as indicated by the lines 320A-320D.

Once the MPRE 224 of FIG. 4 has been determined, the instructions within the vehicle control module 232 cause the processor(s) 210 to cause the vehicle 100 to operate within the confines defined by the MPRE 224. As mentioned before, the vehicle 100 may be an autonomous vehicle that is controlled by the autonomous driving system 160 so as to operate within the confines defined by the MPRE 224. However, the vehicle 100 could be semi-autonomous, such that a driver has control of the vehicle 100 in certain situations. For example, the driver may have shared control of the vehicle 100. The autonomous driving system 160 can intervene or override the driver commands to cause the vehicle 100 to operate within the confines defined by the MPRE 224. Further still, the MPRE 224 may act in concert with the safety system, which activates if it is deemed necessary to keep the driver safe such that the vehicle operates within the confines defined by the MPRE 224.

Shared control can be implemented in a number of different ways and essentially blend control inputs provided by the driver and control inputs provided by the autonomous driving system 160. In some cases, the instructions within the vehicle control module 232 cause the processor(s) 210 to predict a driver intent for a defined time horizon based on operational information and contextual information, determine a vehicle control solution to operate the vehicle 100 within the MPRE 224 in the defined time horizon and apply the vehicle control solution to the vehicle 100. The operating information may include the vehicle state and may be determined by one or more sensors of the vehicle 100 and/or vehicle systems of the vehicle 100. The contextual information may characterize the surrounding contextual environment of the vehicle and may be determined by one or more sensors of the vehicle 100 and/or vehicle systems of the vehicle 100.

For example, the instructions within the vehicle control module 232 cause the processor(s) 210 to feed the MPRE 224 into a control algorithm that is formulated as an optimization problem. In various embodiments, the control algorithm may be implemented using model predictive control (MPC). MPC can be used to predict future dynamic problems forward in time over a time horizon, and a solution can be implemented and calculated to avoid the predicted problem. Embodiments may be implemented in which the controller has at least two main objectives. These include a short-term objective of restricting fast dynamics related to vehicle stability and tracking driver commands and a longer-term objective of keeping the vehicle within a safe path on the road. Accordingly, embodiments may be implemented to use a variable time discretization for the MPC horizon to account for short-term and longer-term objectives. The controller (MPC problem) may use models such as a planar bicycle model with weight transfer, a brush tire model, and path coordinate positional dynamics. More complex models may be used in other embodiments.

The control algorithm may be configured to provide a series of blended controls over each time step out to the time horizon. The autonomous driving system 160 may then apply the first blended control in the series to the vehicle 100. The blended control may indicate that the driver input is to be passed through or that system-generated inputs are to be combined with the driver inputs in varying degrees. After that, the system may iterate over the same calculations for the next time step.

Accordingly, the blending may occur for an individual time step and for subsequent time steps until a control input provided by the driver is within an acceptable range defined by the MPRE 224. Thus, the system does not necessarily take control from the driver as an absolute once the MPRE 224 is violated but instead provides correcting actions so long as the driver inputs remain inadequate.

Figure 6:
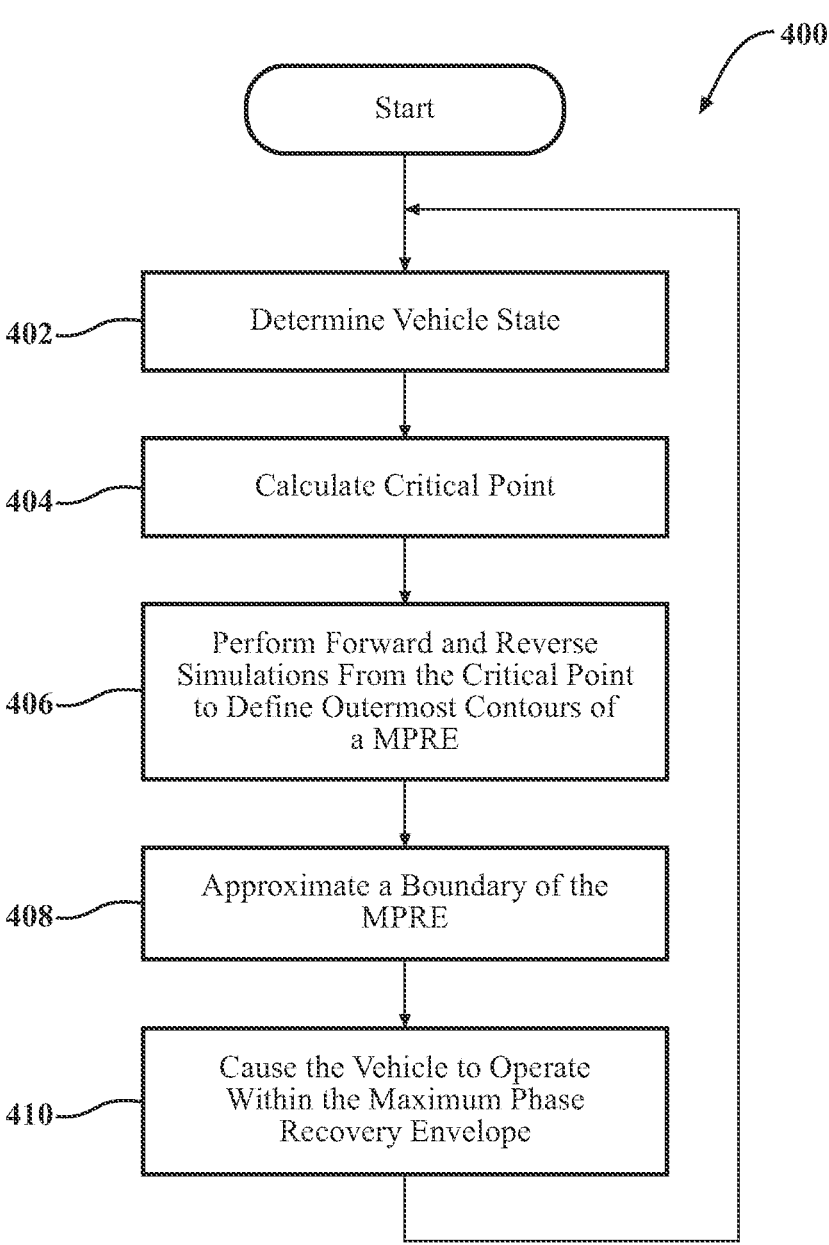
FIG. 6 illustrates a method for determining an MPRE.

Referring to FIG. 6, a method 400 for determining the MPRE 224 is shown. The method 400 will be described from the viewpoint of the vehicle 100 of FIG. 3 and the MPRE system 170 of FIG. 4. However, it should be understood that this is just one example of implementing the method 400. While method 400 is discussed in combination with the MPRE system 170, it should be appreciated that the method 400 is not limited to being implemented within the MPRE system 170, but is instead one example of a system that may implement the method 400. Additionally, it should be understood that any of the steps and/or methodologies previously described when describing the MPRE system 170 are equally applicable to the method 400 and may or may not be repeated.

In step 402, the instructions within the vehicle control module 232 cause the processor(s) 210 to determine the vehicle state. The vehicle state of the vehicle 100 may be determined by monitoring the output of one or more sensors forming the sensor system 120 of the vehicle 100 and/or information from the vehicle systems 140, both of which will be described later in this description. The state of the vehicle can include things such as yaw rate, velocity, sideslip, rear-wheel speed, lateral error, course error, roadwheel angle, and/or engine torque.

In step 404, the instructions within the vehicle control module 232 cause the processor(s) 210 to calculate a critical point, such as the critical points 302A-302D previously described. The critical point may be defined as the maximum defined sideslip and the maximum yaw rate the vehicle 100 can recover from. In other words, the critical point may be at an outermost nullcline of a positive maximum counter steer and a negative maximum counter steer that prevents a vehicle 100 from spinning out past a defined sideslip, for example $\beta = \pm \pi/2$.

In step 406, the instructions within the vehicle control module 232 cause the processor(s) 210 to perform forward and reverse in time simulations from the critical point to define the outermost contours of the MPRE 224. These forward in reverse simulations in time are performed by using given measurements and vehicle parameters to forward and reverse simulate the yaw rate-sideslip contour corresponding to this point.

In step 408, once the outermost contours of the MPRE 224 are determined, the instructions within the vehicle control module 232 cause the processor(s) 210 to approximate the boundaries of the MPRE 224 by utilizing linear approximation. The linear approximation of the MPRE 224 is now essentially the MPRE 224 that will be used to control the vehicle 100.

In step 410, the instructions within the vehicle control module 232 cause the processor(s) 210 to control the vehicle 100 such that it operates within the confines defined by the MPRE 224. As explained previously, the vehicle 100 may be an autonomous vehicle that is controlled by the autonomous driving system 160 so as to operate within the confines defined by the MPRE 224. However, the vehicle 100 could be semi-autonomous, such that a driver has control of the vehicle 100 in certain situations. For example, the driver may have shared control of the vehicle 100. The autonomous driving system 160 can intervene or override the driver commands to cause the vehicle 100 to operate within the confines defined by the MPRE 224. Further still, the MPRE 224 may act in concert with the safety system, which activates if it is deemed necessary to keep the driver safe such that the vehicle operates within the confines defined by the MPRE 224.

FIG. 3 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the MPRE system 170 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 3). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify, and/or sense other things in the external environment of the vehicle 100, such as lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, arrangement or groups thereof that enable information/data to be entered into a machine. The input system 130 can receive an input from a vehicle passenger (e.g., a driver or a passenger). The vehicle 100 can include an output system 135. An "output system" includes any device, component, arrangement, or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 3. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the MPRE system 170, and/or the autonomous driving system 160 can be operatively connected to communicate with the vehicle systems 140 and/or individual components thereof. For example, returning to FIG. 3, the processor(s) 110 and/or the autonomous driving system 160 can be in communication to send and/or receive information from the vehicle systems 140 to control the movement, speed, maneuvering, heading, direction, etc. of the vehicle 100. The processor(s) 110, the MPRE system 170, and/or the autonomous driving system 160 may control some or all of these vehicle systems 140 and, thus, may be partially or fully autonomous.

The processor(s) 110, the MPRE system 170, and/or the autonomous driving system 160 can be operatively connected to communicate with the vehicle systems 140 and/or individual components thereof. For example, returning to FIG. 3, the processor(s) 110, the MPRE system 170, and/or the autonomous driving system 160 can be in communication to send and/or receive information from the vehicle systems 140 to control the movement, speed, maneuvering, heading, direction, etc. of the vehicle 100. The processor(s) 110, the MPRE system 170, and/or the autonomous driving system 160 may control some or all of these vehicle systems 140.

The processor(s) 110, the MPRE system 170, and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110, the MPRE system 170, and/or the autonomous driving system 160 can control the direction and/or speed of the vehicle 100. The processor(s) 110, the MPRE system 170, and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 210, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features including traffic signs, trees, shrubs, neighboring vehicles, pedestrians, etc.

The autonomous driving system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 either independently or in combination with the MPRE system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:

a processor; and a memory in communication with the processor, the memory having a vehicle control module including instructions that, when executed by the processor, cause the processor to:

determine a critical point on a phase plane indicating a maximum defined recovery point a vehicle can recover from, perform forward and reverse simulations in time from the critical point to define outer contours of a maximum phase recovery envelope using parameters and state of the vehicle, and cause the vehicle to operate within the maximum phase recovery envelope.

2. The system of claim 1, wherein the critical point is defined by a maximum allowed sideslip and a maximum yaw rate the vehicle can recover from.

3. The system of claim 1, wherein the critical point is at an outer nullcline of a positive maximum counter steer and a negative maximum counter steer that prevents a vehicle from spinning out.

4. The system of claim 1, wherein the vehicle control module further includes instructions that, when executed by the processor, cause the processor to approximate a boundary of the maximum phase recovery envelope by performing a linear fit of the outer contours of the maximum phase recovery envelope.

5. The system of claim 1, wherein the forward and reverse simulations are performed online.

6. The system of claim 1, wherein the vehicle control module further includes instructions that, when executed by the processor, cause the processor to:

predict a driver intent for a defined time horizon based on operational information and contextual information;

determine a vehicle control solution to operate the vehicle within the maximum phase recovery envelope in the defined time horizon; and apply the vehicle control solution to the vehicle.

7. The system of claim 1, wherein:

the parameters of the vehicle include one or more of: front axle center of mass distance, rear axle center of mass distance, center of gravity height, tire radius, engine to wheel torque ratio, vehicle mass, vehicle yaw moment of inertia, lumped rear axle yaw moment of inertia, front coefficient of friction, rear coefficient of friction, and tire cornering stiffness; and the state of the vehicle include one or more of: yaw rate, velocity, sideslip, rear wheel speed, lateral error, course error, roadwheel angle, and engine torque.

8. A method comprising steps of:

determining a critical point on a phase plane indicating a maximum allowed recovery point a vehicle can recover from;

performing forward and reverse simulations in time from the critical point to define outer contours of a maximum phase recovery envelope using parameters and state of the vehicle; and causing the vehicle to operate within the maximum phase recovery envelope.

9. The method of claim 8, wherein the critical point is defined by a maximum allowed sideslip and a maximum yaw rate the vehicle can recover from.

10. The method of claim 8, wherein the critical point is at an outer nullcline of a positive maximum counter steer and a negative maximum counter steer that prevents a vehicle from spinning out.

11. The method of claim 8, further comprising the step of approximating a boundary of the maximum phase recovery envelope by performing a linear fit of the outer contours of the maximum phase recovery envelope.

12. The method of claim 8, wherein the forward and reverse simulations are performed online.

13. The method of claim 8, further comprising the steps of:

predicting a driver intent for a defined time horizon based on operational information and contextual information;

determining a vehicle control solution to operate the vehicle within the maximum phase recovery envelope in the defined time horizon; and applying the vehicle control solution to the vehicle.

14. The method of claim 8, wherein:

the parameters of the vehicle include one or more of: front axle center of mass distance, rear axle center of mass distance, center of gravity height, tire radius, engine to wheel torque ratio, vehicle mass, vehicle yaw moment of inertia, lumped rear axle yaw moment of inertia, front coefficient of friction, rear coefficient of friction, and tire cornering stiffness; and the state of the vehicle include one or more of: yaw rate, velocity, sideslip, rear wheel speed, lateral error, course error, roadwheel angle, and engine torque.

15. A non-transitory computer readable medium having instructions that, when executed by a processor, cause the processor to:

determine a critical point on a phase plane indicating a maximum allowed recovery point a vehicle can recover from;

perform forward and reverse simulations in time from the critical point to define outer contours of a maximum phase recovery envelope using parameters and state of the vehicle; and cause the vehicle to operate within the maximum phase recovery envelope.

16. The non-transitory computer readable medium of claim 15, wherein the critical point is defined by a maximum allowed sideslip and a maximum yaw rate the vehicle can recover from.

17. The non-transitory computer readable medium of claim 15, wherein the critical point is at an outer nullcline of a positive maximum counter steer and a negative maximum counter steer that prevents a vehicle from spinning out.

18. The non-transitory computer readable medium of claim 15, further including instructions that, when executed by the processor, cause the processor to approximate a boundary of the maximum phase recovery envelope by performing a linear fit of the outer contours of the maximum phase recovery envelope.

19. The non-transitory computer readable medium of claim 15, wherein the forward and reverse simulations are performed online.

20. The non-transitory computer readable medium of claim 15, further including instructions that, when executed by the processor, cause the processor to:

predict a driver intent for a defined time horizon based on operational information and contextual information;

determine a vehicle control solution to operate the vehicle within the maximum phase recovery envelope in the defined time horizon; and apply the vehicle control solution to the vehicle.

* * * * *